US008875832B2

(12) United States Patent
Kitamura

(10) Patent No.: US 8,875,832 B2
(45) Date of Patent: Nov. 4, 2014

(54) STRADDLE-TYPE VEHICLE

(75) Inventor: Yu Kitamura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1563 days.

(21) Appl. No.: 11/961,098

(22) Filed: Dec. 20, 2007

(65) Prior Publication Data

US 2008/0156291 A1 Jul. 3, 2008

(30) Foreign Application Priority Data

Dec. 28, 2006 (JP) ................................ 2006-356616

(51) Int. Cl.

| | |
|---|---|
| ***B62D 61/02*** | (2006.01) |
| ***B60K 11/06*** | (2006.01) |
| ***F02M 35/024*** | (2006.01) |
| ***F02M 35/04*** | (2006.01) |
| ***F02M 35/16*** | (2006.01) |

(52) U.S. Cl.

CPC ............ *F02M 35/024* (2013.01); *F02M 35/04* (2013.01); *F02M 35/162* (2013.01)

USPC ......... 180/229; 180/68.1; 180/68.2; 180/68.3

(58) Field of Classification Search

USPC .............................. 180/68.1, 68.2, 68.3, 229

See application file for complete search history.

(56) References Cited

U.S. PATENT DOCUMENTS

| | | | | |
|---|---|---|---|---|
| 1,745,950 | A * | 2/1930 | Orem | 55/334 |
| 4,149,496 | A * | 4/1979 | Palma | 123/470 |
| 6,102,149 | A * | 8/2000 | Suzuki et al. | 180/229 |
| 6,920,950 | B2 * | 7/2005 | Sonoda | 180/68.3 |
| 7,568,540 | B1 * | 8/2009 | Jones et al. | 180/68.3 |
| 2002/0096377 | A1 * | 7/2002 | Kuji et al. | 180/68.3 |
| 2003/0121708 | A1 * | 7/2003 | Laivins et al. | 180/229 |
| 2005/0098142 | A1 * | 5/2005 | Nakagome et al. | 123/198 E |
| 2008/0083200 | A1 * | 4/2008 | Gruber et al. | 55/385.3 |

FOREIGN PATENT DOCUMENTS

| | | | |
|---|---|---|---|
| JP | 09-242630 | | 9/1997 |
| JP | 09242630 | A * | 9/1997 |

* cited by examiner

*Primary Examiner* — Hau Phan
*Assistant Examiner* — Bryan Evans
(74) *Attorney, Agent, or Firm* — Keating & Bennett, LLP

(57) ABSTRACT

A straddle-type vehicle having an air cleaner disposed in front of a down tube that funnels running wind to a funneled wind target member like an engine that is disposed beneath the air cleaner. The air cleaner has an air cleaner cap that faces a front fender. Side end sections of the air cleaner cap protrude further toward the front of the motorcycle than a central section of the air cleaner cap.

11 Claims, 6 Drawing Sheets

STRADDLE-TYPE VEHICLE

RELATED APPLICATIONS

This application claims the benefit of priority under 35 USC 119 of Japanese patent application no. 2006-356616, filed on Dec. 28, 2006, which application is hereby incorporated by reference in its entirety.

BACKGROUND OF THE INVENTION

1. Field of the Invention

The invention relates to a straddle-type vehicle in which an air cleaner is disposed on a down tube that extends downward from a steering head pipe.

2. Description of Related Art

A straddle-type vehicle such as an underbone motorcycle often includes an air cleaner disposed on a down tube that extends downward from a steering head pipe. For example, the air cleaner may be disposed in front of the down tube, and an engine (funneled wind target member) disposed beneath the air cleaner (see, for example, Japanese Patent No. 3586740, page 4, FIG. 3).

However, because a pair of front forks rotatably supporting a front wheel are disposed in front of the funneled wind target member, the amount of running wind that is funneled to the funneled wind target member is limited, and sufficient running wind is not always funneled to the funneled wind target member. In addition, because the air cleaner is disposed above the funneled wind target member, it is extremely difficult to move the funneled wind target member upward.

SUMMARY OF THE INVENTION

The invention has been devised in light of these circumstances and provides a straddle-type vehicle that funnels more running wind from an air cleaner disposed in front of a down tube to a funneled wind target member disposed beneath the air cleaner.

A straddle-type vehicle according to the invention includes a steering head pipe and a down tube that extends downward from the steering head pipe. An air cleaner is disposed in front of the down tube. A front wheel is disposed beneath the steering head pipe. A front fender covers above and behind the front wheel. Running wind is funneled to a funneled wind target member (for example, an engine) disposed beneath the air cleaner. The air cleaner has a fender facing surface that faces the front fender. Side end sections of the fender facing surface protrude further forward than a central section of the fender facing surface.

According to the invention, because the side end sections of the fender facing surface protrude further forward than the central section, the air cleaner traps running wind that flows along the front fender, and the trapped running wind is efficiently funneled to the funneled wind target member.

In one embodiment, the fender facing surface has a curved shape.

In this embodiment, a curvature of the side end sections of the fender facing surface may be greater than a curvature of the central section of the fender facing surface.

In another embodiment, the front fender turns along with the front wheel centering on the steering head pipe. The fender facing surface has a shape that is aligned with a movement path of the front fender when the front fender is turned.

In another embodiment, the funneled wind target member is disposed further to the rear than the air cleaner in a side view, and at least one section of the fender facing surface inclines toward the funneled wind target member in the side view.

In this embodiment, the funneled wind target member may be an engine that has an exhaust pipe, with the at least one section of the fender facing surface inclined toward the exhaust pipe.

The funneled wind target member may also be an engine that has a cylinder head, with the at least one section of the fender facing surface inclined toward the cylinder head.

In another embodiment, an under air cleaner space is formed between the air cleaner and the funneled wind target member, and a vehicle running functional member that is used to provide functions for running the straddle-type vehicle is disposed in the under air cleaner space.

The invention accordingly provides a straddle-type vehicle that funnels more running wind from an air cleaner disposed in front of a down tube toward a funneled wind target member such as an engine that is disposed beneath the air cleaner.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
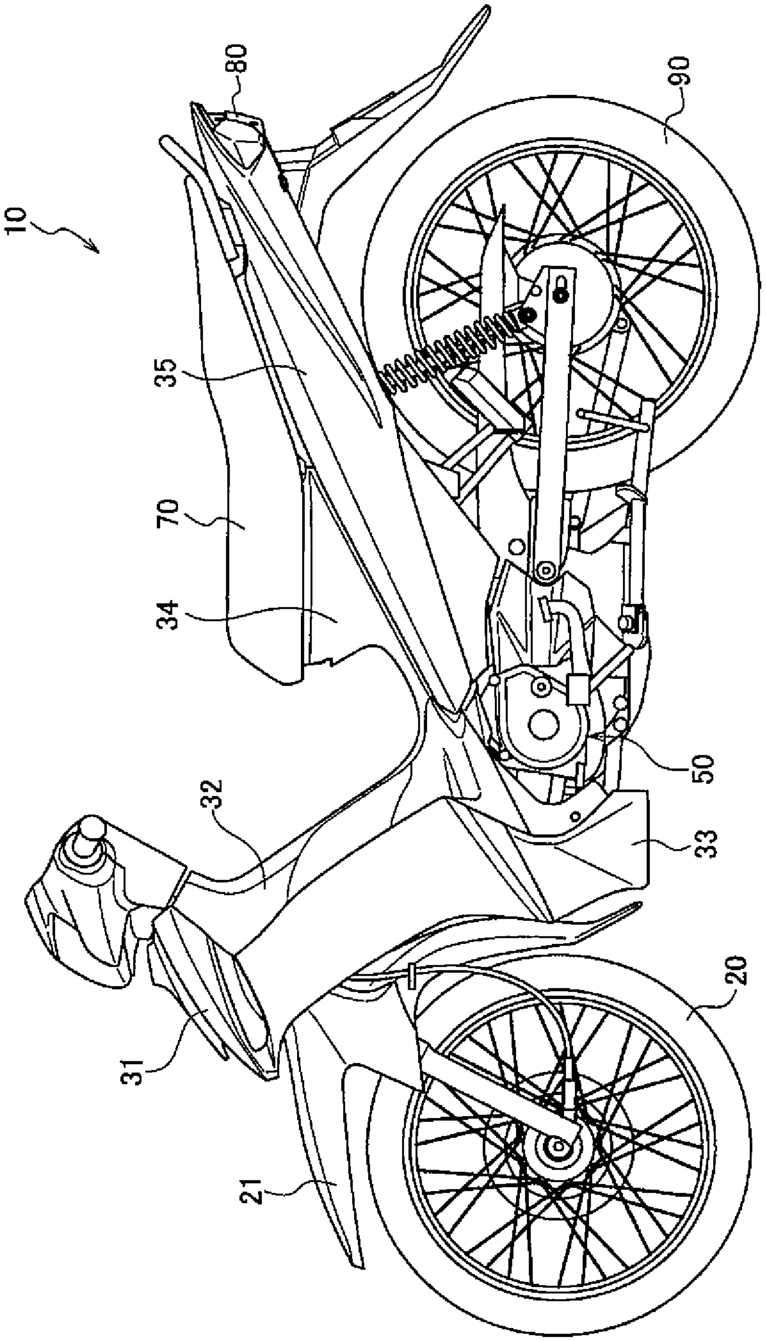
FIG. 1 is a left side view of a motorcycle according to an embodiment of the invention.

An embodiment of a straddle-type vehicle according to the invention is now described with reference to the drawings. In the drawings, structural members that are the same or similar are denoted with the same or similar reference numerals. The drawings are schematic, and thus the relative scale of dimensions and the like may be different from the real object. Specific dimensions and the like can be determined based on reference to the following description. In addition, the relationship and scale of respective dimensions may vary from drawing to drawing.

(Structure of the Straddle-Type Vehicle)

Figure 2:
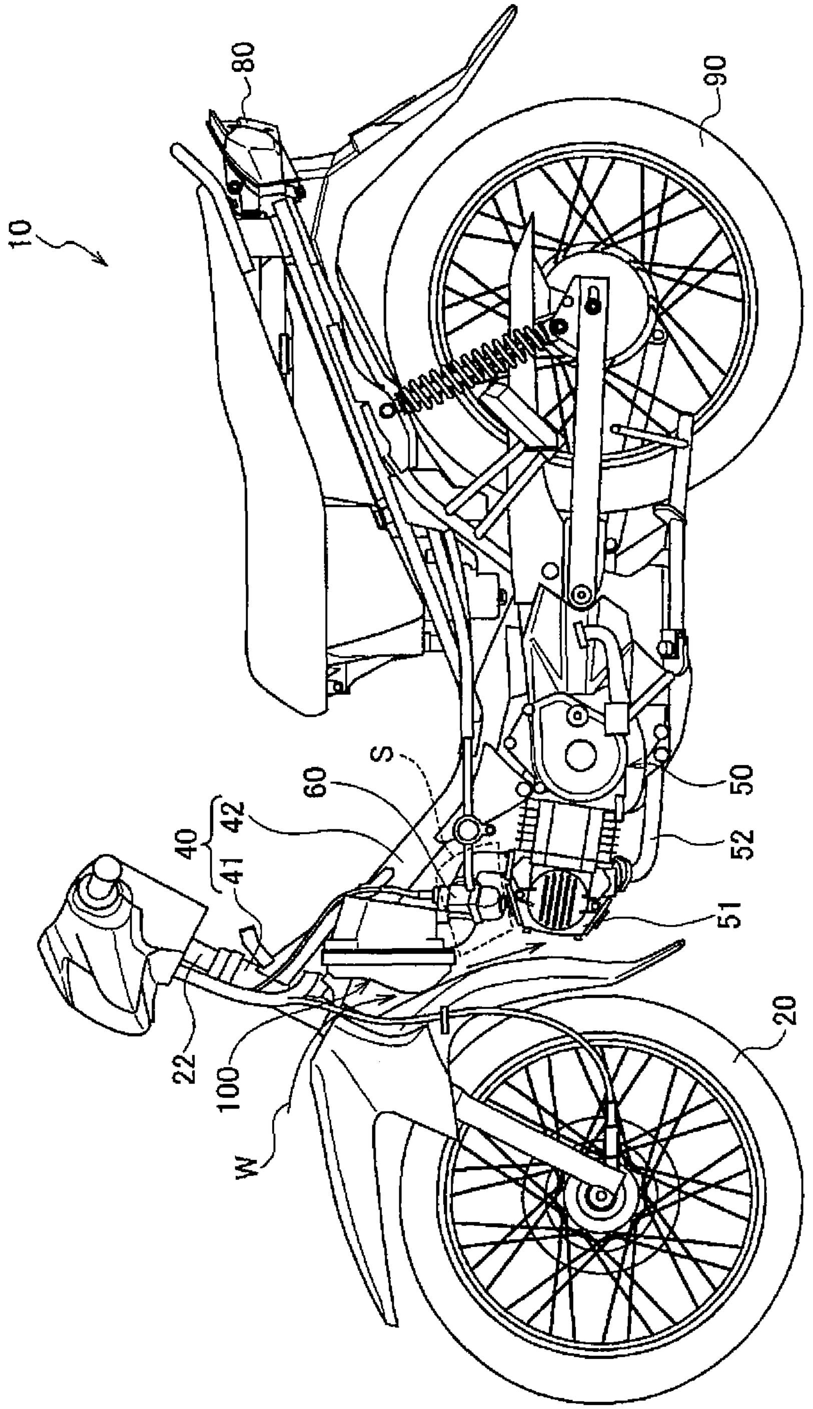
FIG. 2 is a left side view of the motorcycle with vehicle body covers removed.

FIG. 1 is a left side view of a motorcycle 10 which is the straddle-type vehicle according to the present embodiment. FIG. 2 is a left side view of motorcycle 10 with vehicle body covers removed. Motorcycle 10 is an underbone motorcycle that has a body frame 40, and more particularly a down tube 42, that is disposed further downward as compared to a standard saddle-type motorcycle. Motorcycle 10 has a front wheel 20 and a rear wheel 90 driven by driving force generated by an engine 50.

Motorcycle 10 is covered by a plurality of vehicle body covers including a body cowl 31, a leg shield 32, an under cover 33, an under seat cover 34 and a side cover 35. Body cowl 31 is disposed in front of a steering head pipe 41 and extends downward. Leg shield 32 is disposed in front of the legs of a rider who sits on a seat 70. Under cover 33 is disposed beneath and is attached to body cowl 31 and leg shield 32. Under seat cover 34 is disposed beneath seat 70 and is connected to leg shield 32. Side cover 35 is disposed beneath under seat cover 34 and extends from a lower end of leg shield 32 to a tail lamp unit 80.

A front fender 21 covers above and behind front wheel 20. Front fender 21 turns to the left and right along with front wheel 20 centering on steering head pipe 41. Body frame 40 includes steering head pipe 41 and down tube 42. Steering head pipe 41 turnably supports a steering shaft 22. Down tube 42 extends downward from steering head pipe 41 and is inclined toward the rear of motorcycle 10 (rearward).

Front wheel 20 is disposed beneath steering head pipe 41. An air cleaner 100 is disposed to the front of (forward of) and attached to down tube 42. A carburetor 60 that adjusts the amount of fuel supplied to engine 50 is connected to air cleaner 100. Engine 50 is disposed beneath and to the rear of air cleaner 100 in a side view.

Engine 50 has a cylinder head 51 and an exhaust pipe 52. In one embodiment, engine 50 is a single cylinder, 4 stroke engine. Exhaust pipe 52 connected to cylinder head 51 is connected to a muffler that is disposed on a right side of motorcycle 10. Engine 50 is disposed beneath air cleaner 100 and is a "funneled wind target member" to which running wind W is funneled.

Running wind W passes between front fender 21 and air cleaner 100 and is funneled to engine 50, and more particularly to cylinder head 51 and exhaust pipe 52. A space S (an under air cleaner space) is formed between air cleaner 100 and engine 50. Vehicle running functional members that provide functions for running motorcycle 10 are disposed in space S. For example, carburetor 60 is disposed in and substantially fills space S.

(Arrangement and Structure of the Air Cleaner)

Figure 3:
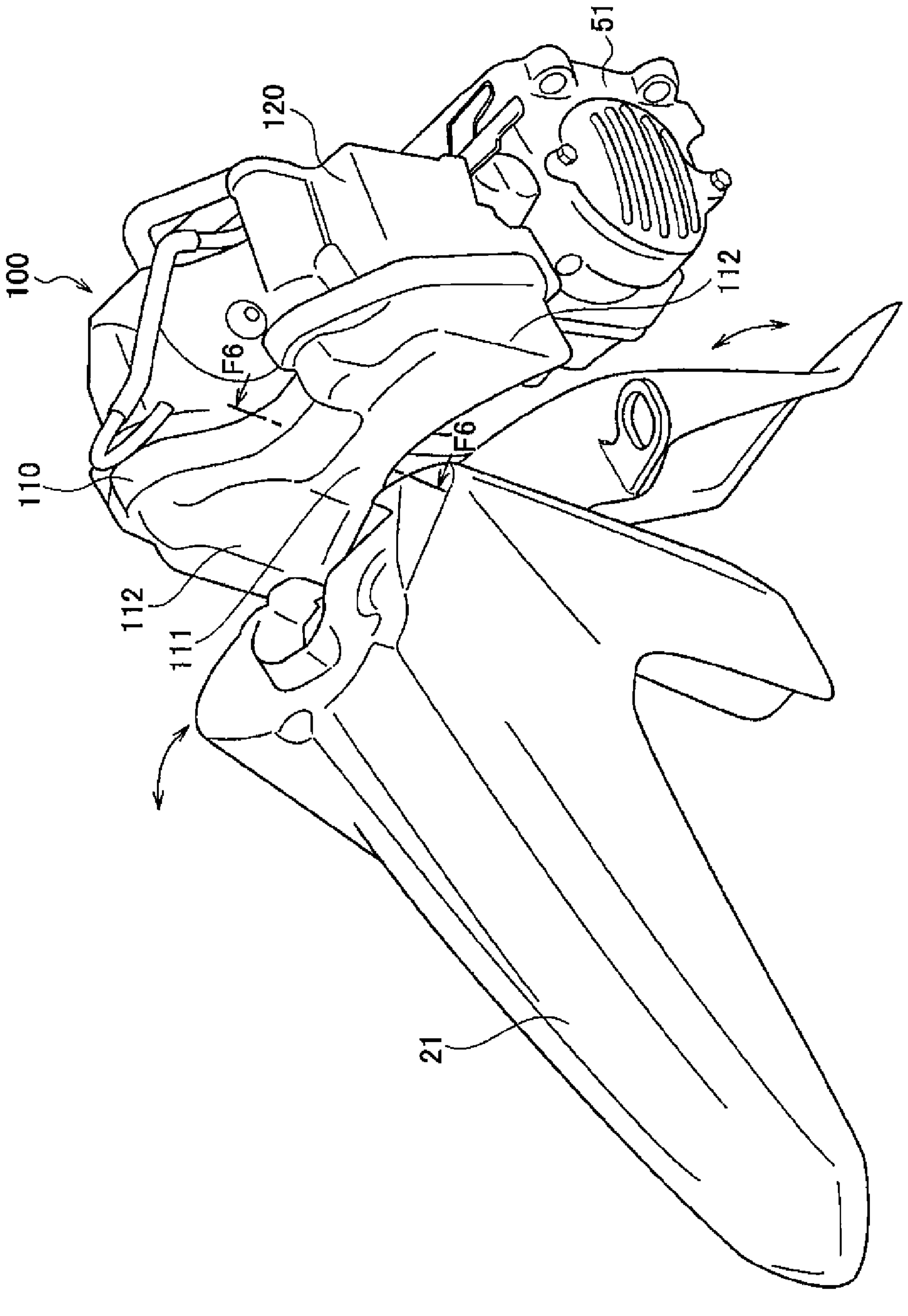
FIG. 3 is a perspective view of a general outline of an air cleaner and vicinity according to an embodiment of the invention.

The arrangement and structure of air cleaner 100 is now explained FIG. 3 is a perspective view of the general outline of air cleaner 100 and its periphery. As can be seen in FIG. 3, front fender 21 is in front of air cleaner 100 and cylinder head 51 is beneath air cleaner 100.

Air cleaner 100 is formed by an air cleaner cap 110 and an air cleaner case 120. Air cleaner cap 110 faces front fender 21 and forms a fender facing surface. Air cleaner cap 110 is a curved surface having a shape that is aligned with the movement path of front fender 21 as front fender 21 is turned (the direction indicated by the arrows in FIG. 3).

Side end sections 112 protrude further forward than a central section 111 of air cleaner cap 110, namely, protrude further toward front fender 21. In a plan view, the curvature of side end sections 112 is greater than the curvature of central section 111.

Figure 4:
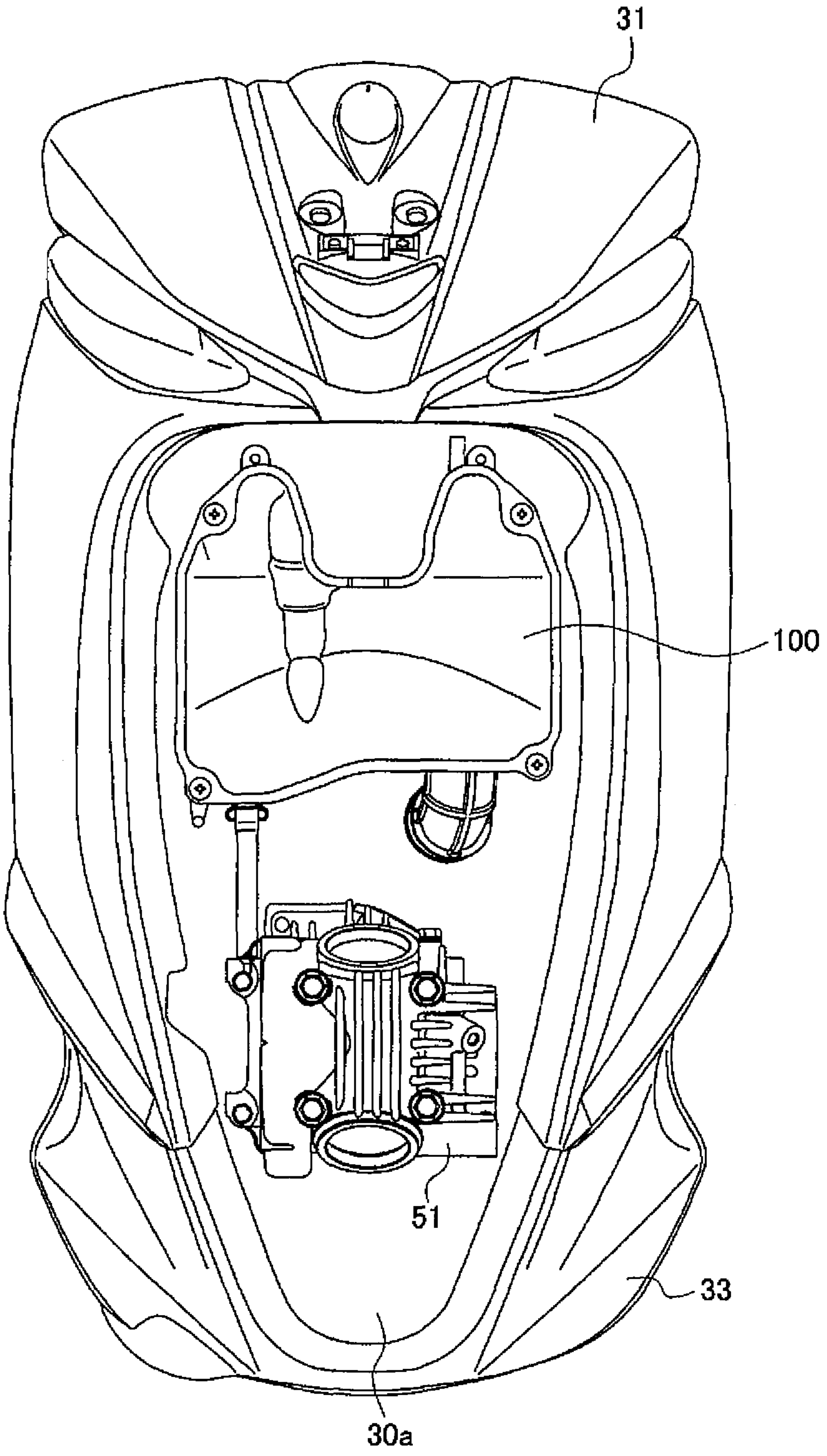
FIG. 4 is a front view of a general outline of the motorcycle.

FIG. 4 is a front view of the general outline of motorcycle 10. Front wheel 20, front fender 21 and the like are omitted from FIG. 4 for the sake of explanatory simplicity. As can be seen from FIG. 4, air cleaner 100 is disposed to the inside of an opening 30*a* that is surrounded by body cowl 31 and under cover 33. Cylinder head 51 of engine 50 is disposed beneath air cleaner 100.

Figure 5:
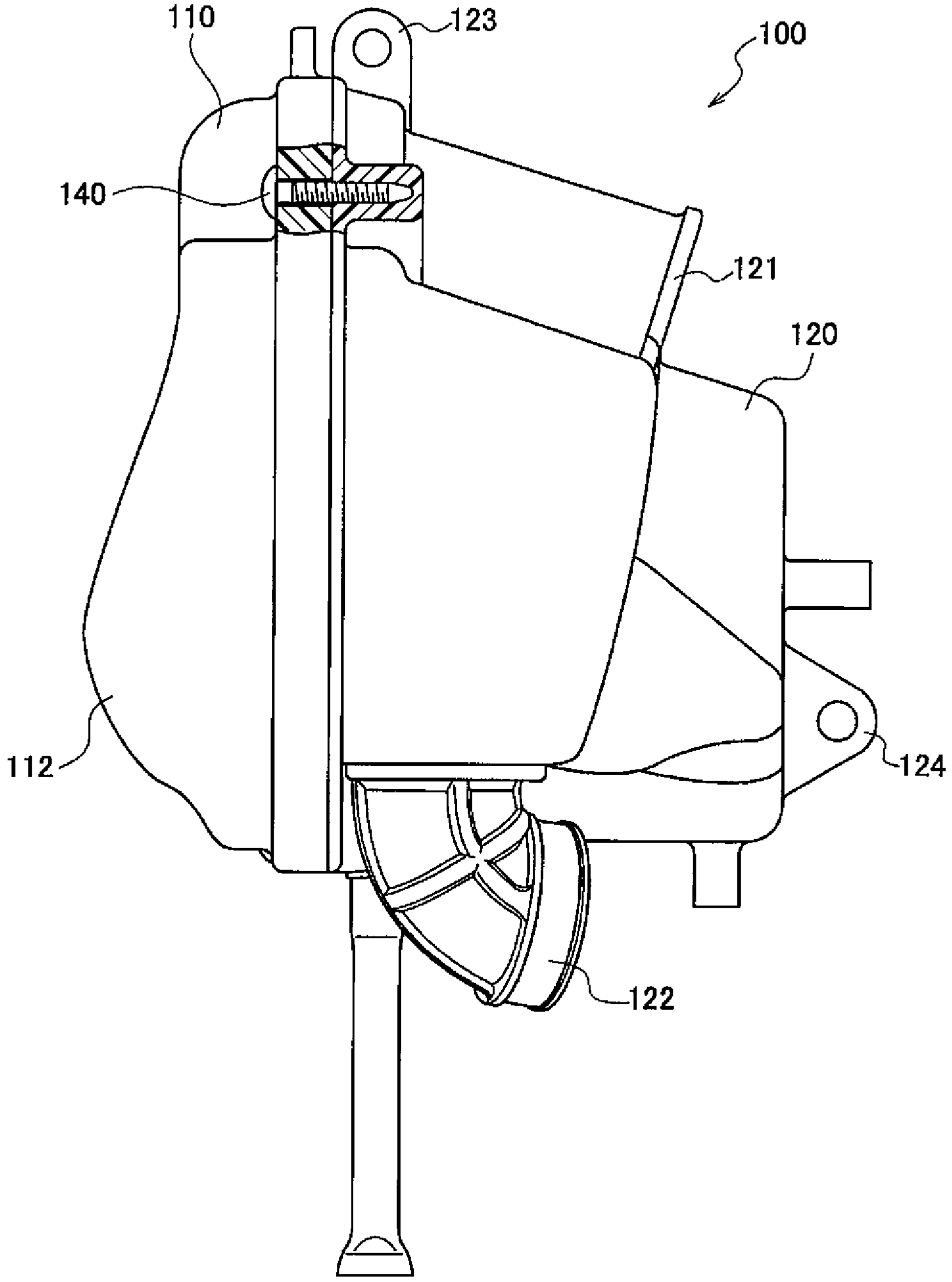
FIG. 5 is a side view of the air cleaner unit.

FIG. 5 is a side view of the air cleaner 100 unit. As shown in FIG. 5, air cleaner cap 110 is attached to air cleaner case 120 by a tapping screw 140. As described above, side end sections 112 that protrude toward front fender 21 are formed in air cleaner cap 110.

An outside air intake port 121 that opens toward the rear is formed in an upper left section of air cleaner case 120. A duct 122 is attached to a lower left section of air cleaner case 120, and is connected to carburetor 60. Attachment members 123 and 124, to be fixed to stays formed on down tube 42, are respectively provided at upper and rear ends of air cleaner case 120.

Figure 6:
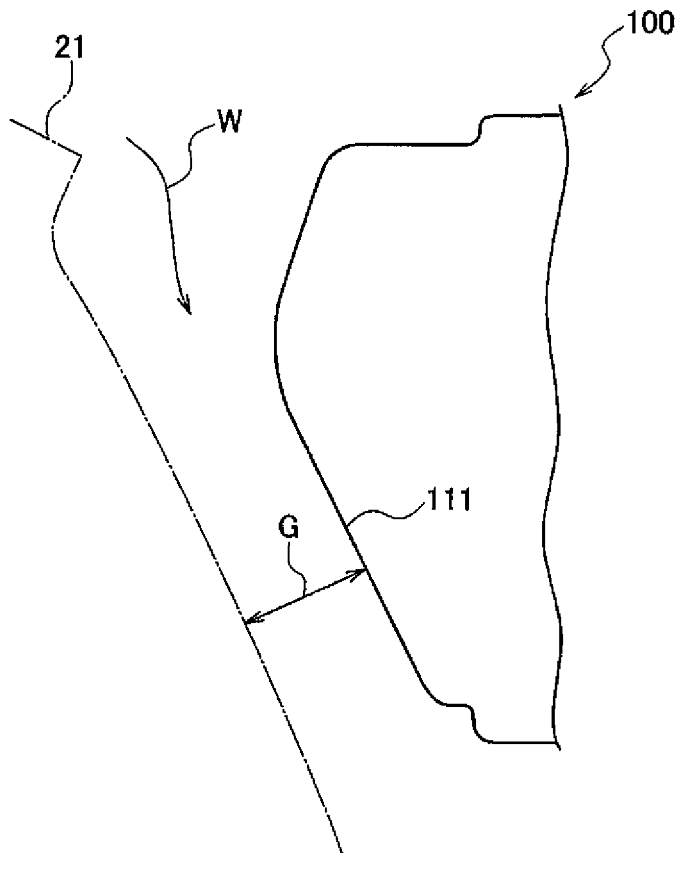
FIG. 6 is a cross sectional view along line F6-F6 of FIG. 3.

FIG. 6 is a cross sectional view of the general outline of air cleaner 100 along line F6-F6 of FIG. 3 (hatching omitted). As can be seen from FIG. 6, central section 111 of air cleaner 100 inclines rearward toward cylinder head 51 and exhaust pipe 52 of engine 50. In addition, central section 111 is generally parallel with front fender 21 in side view. Running wind W passes through a gap G between front fender 21 and central section 111, and is funneled downward.

(Operation & Advantages)

In motorcycle 10, because side end sections 112 of air cleaner cap 110 that face front fender 21 protrude further forward than central section 111, air cleaner 100 traps running wind W that flows along front fender 21, and the trapped running wind W is efficiently funneled to engine 50 (the funneled wind target member). In addition, since air cleaner 100 funnels running wind W from the front to engine 50, dirt or the like that flies toward motorcycle 10 along with running wind W is inhibited from being sucked into air cleaner 100.

In this embodiment, air cleaner cap 110 (the fender facing surface) has a curved shape. More specifically, when motorcycle 10 is seen in a plan view, the curvature of side end sections 112 is greater than the curvature of central section 111 of air cleaner cap 110. In other words, running wind W that flows along front fender 21 is funneled toward a vehicle body central section where engine 50 is disposed. As a result, sufficient running wind W is funneled to engine 50.

In addition, air cleaner cap 110 has a shape that is aligned with the movement path of front fender 21 as front fender 21 is turned. Thus, air cleaner cap 110 efficiently funnels running wind W to engine 50 without interfering with the turning of front fender 21 and steering of front wheel 20.

In this embodiment, central section 111 of air cleaner cap 110 inclines toward cylinder head 51 and exhaust pipe 52 of engine 50 in a side view. As a result, air cleaner cap 110 more reliably funnels the trapped running wind W to the funneled wind target member.

In this embodiment, vehicle running functional members that are used to provide functions for running motorcycle 10 are disposed in space S. For example, carburetor 60 is disposed in and substantially fills space S. As a result, running wind W funneled to engine 50 by air cleaner cap 110 cannot escape from space S toward the rear, and running wind W is more reliably funneled to engine 50.

OTHER EMBODIMENTS

While one embodiment of the invention has been described, the invention is not limited by the description and the drawings that constitute one section of the disclosure. Various modified forms of the invention will be apparent from the disclosure to those skilled in the art.

For example, although carburetor 60 is described as being disposed in space S, it is not essential for carburetor 60 to be disposed in space S. Another auxiliary member of engine 50 such as a voltage regulator, an air intake system or the like, may instead be disposed in space S.

In the above-described embodiment, central section 111 of air cleaner cap 110 inclines toward engine 50 in a side view. However, central section 111 need not be inclined.

In the above-described embodiment, engine 50 is disposed as a funneled wind target member that is beneath air cleaner 100. However, instead of engine 50, another member such as a radiator, an oil cooler or the like may be the funneled wind target member.

In the above-described embodiment, air cleaner cap 110 inclines toward cylinder head 51 and exhaust pipe 52. However, air cleaner cap 110 may be inclined toward just one of cylinder head 51 and exhaust pipe 52. In other words, cylinder head 51 and exhaust pipe 52 do not need to be positioned in the vicinity of each other.

As is apparent, the invention includes various modified embodiments not described herein. Accordingly, the scope of the invention is defined by the features set forth in the following claims.

The invention claimed is:

1. A straddle-type vehicle comprising:

a steering head pipe;

a down tube that extends downward from the steering head pipe;

an air cleaner disposed directly in front of the down tube and in a central section of the vehicle;

a front wheel disposed beneath the steering head pipe;

a front fender that covers above and behind the front wheel; and a funneled wind target member, disposed below the air cleaner, to which running wind is funneled by the air cleaner, wherein the air cleaner includes a fender facing surface that faces the front fender, and side end sections of the fender facing surface protrude further forward than a central section of the fender facing surface such that the fender facing surface has a concave curved shape arranged to funnel the running wind to the funneled wind target member.

2. The straddle-type vehicle according to claim 1, wherein a curvature of the side end sections of the fender facing surface is greater than a curvature of the central section of the fender facing surface.

3. The straddle-type vehicle according to claim 1, wherein the front fender is arranged to turn along with the front wheel centering on the steering head pipe, and a gap is maintained between the fender facing surface and the front fender when the front fender is turned.

4. The straddle-type vehicle according to claim 1, wherein the funneled wind target member is disposed further to a rear of the vehicle than the air cleaner in a side view of the vehicle, and at least one section of the fender facing surface inclines toward the funneled wind target member in the side view.

5. The straddle-type vehicle according to claim 4, wherein the funneled wind target member is an engine including an exhaust pipe, and the at least one section of the fender facing surface inclines toward the exhaust pipe.

6. The straddle-type vehicle according to claim 4, wherein the funneled wind target member is an engine including a cylinder head, and the at least one section of the fender facing surface inclines toward the cylinder head.

7. The straddle-type vehicle according to claim 4, wherein an under air cleaner space is defined between the air cleaner and the funneled wind target member, and a vehicle running functional member that provides functions for running the straddle-type vehicle is disposed in the under air cleaner space.

8. The straddle-type vehicle according to claim 7, wherein the functional member is a carburetor.

9. The straddle-type vehicle according to claim 1, wherein the fender facing surface is an air cleaner cap.

10. The straddle-type vehicle according to claim 1, wherein the central section of the fender facing surface of the air cleaner directly opposes the front fender to define a gap between the central section of the fender facing surface and the front fender.

11. The straddle-type vehicle according to claim 1, wherein the funneled wind target member is an engine, a radiator, or an oil cooler.

* * * * *